United States Patent
Farrell et al.

(10) Patent No.: US 6,516,573 B1
(45) Date of Patent: Feb. 11, 2003

(54) INTEGRATED BREAKAWAY FOR SUPPORT POSTS

(75) Inventors: Kevin R. Farrell, St. Louis, MO (US); Paul C. Stallman, II, St. Charles, MO (US); Fred Kuhn, Golden Eagle, IL (US); Richard Berkemeier, Florissant, MO (US)

(73) Assignee: Tyco Flow Services AG, Schaffhausen (CH)

( * ) Notice: Subject to any disclaimer, the term of this patent is extended or adjusted under 35 U.S.C. 154(b) by 0 days.

(21) Appl. No.: 09/226,082

(22) Filed: Jan. 6, 1999

(51) Int. Cl.⁷ .............................................. E04B 1/00
(52) U.S. Cl. ........................ 52/98; 52/720.1; 404/9; 404/6; 404/10; 40/612; 403/2; 248/548; 116/63 R
(58) Field of Search ................. 52/98, 720.1; 404/10, 404/9, 6; 116/63 R; 40/612; 248/548; 403/2

(56) References Cited

U.S. PATENT DOCUMENTS

| | | | |
|---|---|---|---|
| 3,628,296 A | * 12/1971 | Henry | 52/98 |
| 3,951,556 A | 4/1976 | Strizki | 403/2 |
| 3,967,906 A | 7/1976 | Strizki | 403/2 |
| 4,007,564 A | 2/1977 | Chisholm | 52/98 |
| 4,071,970 A | 2/1978 | Strizki | 40/607 |
| 4,126,403 A | 11/1978 | Sweeney et al. | 403/2 |
| 4,154,037 A | 5/1979 | Anderson | 52/296 |
| 4,310,979 A | 1/1982 | Bloom | 40/607 |
| 4,543,764 A | 10/1985 | Kozikowski | 52/746.1 |
| 4,638,608 A | 1/1987 | Coy | 52/98 |
| 4,674,907 A | 6/1987 | Shewchuk | 403/2 |
| 4,759,161 A | 7/1988 | Kucyk, Jr. et al. | 52/99 |
| 4,850,565 A | 7/1989 | Moreno | 248/545 |
| 4,858,876 A | 8/1989 | Moreno | 248/545 |
| 4,923,319 A | 5/1990 | Dent | 403/2 |
| 4,926,592 A | 5/1990 | Nehls | 52/98 |
| 4,928,446 A | 5/1990 | Alexander, Sr. | 52/98 |
| 5,004,366 A | 4/1991 | Simmons | 403/2 |
| 5,060,437 A | 10/1991 | Parsons et al. | 52/298 |
| 5,088,683 A | 2/1992 | Briden | 248/548 |
| 5,094,023 A | 3/1992 | McVey | 40/606 |
| 5,125,194 A | 6/1992 | Granger | 52/98 |
| 5,165,818 A | 11/1992 | Newhart | 404/10 |
| 5,214,886 A | 6/1993 | Hugron | 52/98 |
| D337,153 S | 7/1993 | King | D23/262 |
| 5,474,408 A | 12/1995 | Dinitz et al. | 411/5 |
| 5,480,121 A | * 1/1996 | Rice et al. | 248/548 |
| 5,481,835 A | 1/1996 | Bloom | 52/98 |
| 5,535,555 A | 7/1996 | Boyd et al. | 52/99 |
| 5,596,845 A | 1/1997 | Strizki | 52/98 |
| 5,782,040 A | 7/1998 | McCartan | 52/98 |
| 5,794,910 A | 8/1998 | Granger | 248/548 |
| 6,056,471 A | * 5/2000 | Dinitz | 403/2 |
| 6,113,055 A | * 9/2000 | Salman | 248/548 |
| D433,452 S | * 11/2000 | Ruptash | 404/9 |

* cited by examiner

*Primary Examiner*—Carl D. Friedman
*Assistant Examiner*—Chi Q. Nguyen
(74) *Attorney, Agent, or Firm*—Bryan Cave LLP (57) ABSTRACT

A support post or coupling for a sign post assembly having an integrated breakaway system. The post or coupling has a selected predetermined shape and is adapted for carrying an associated structure. The post or coupling includes an integral weakened region providing an area of structural weakness for allowing the support post to shear upon impact by a vehicle traveling at a minimum speed and impacting the support post from a desired impact angle. The integral weakened region is formed by reducing the cross-sectional area of a portion of the support post such that it is slightly less than the cross-sectional area of the remainder of the support post. The integral weakened region may be formed by swaging the support post, by scoring a groove within the support post, or by creating a series of dimples or perforations within the support post.

4 Claims, 12 Drawing Sheets

INTEGRATED BREAKAWAY FOR SUPPORT POSTS

FIELD OF THE INVENTION

The present invention relates generally to post assemblies installed along roadways and designed to carry various types of signs or related structures and, more particularly, to post assemblies that include breakaway systems that allow the assemblies to shear or break off upon impact, and, most particularly, to breakaway systems integrally incorporated into the post assemblies.

BACKGROUND OF THE INVENTION

Man-made fixed objects frequently populate the sides of roadways including, for example, highway signs, roadway lighting, traffic signals, railroad warning devices, motorist-aid call boxes, mail and newspaper boxes, utility poles and other types of structures typically mounted on post assemblies. Federal, state, and many local governments require that sign post assemblies and other similar structures meet certain requirements set forth by the Federal Highway Administration (FHWA). For example, the American Association of State Highway Transportation Officials' (AASHTO) Standard Specifications for Structured Supports for Highway Signs, Luminaires, and Traffic Signals (1994), which has been adopted by the FHWA, sets forth various requirements related to sign posts and breakaway systems. The Standard requires the maximum change in velocity for a standard vehicle (1800 pounds (816.5 kg)), or its equivalent, striking a sign post assembly at speeds from 20 mph to 60 mph (32 km/h to 97 km/h), not exceed 16.0 fps (4.87 mps), but preferably not exceed 10 fps (3.05 mps). In order to meet these requirements and to reduce the severity of injury to occupants and damage to vehicles when a vehicle impacts a sign post assembly, the assemblies often include a breakaway system. The breakaway systems are designed to allow the sign post assembly and/or its associated structure to break off or bend away when hit by a vehicle with a predetermined impact force and from a particular direction of travel. As of Oct. 1, 1998, the recommendations contained in the National Cooperative Highway Research Program (NCHRP) Report 350 concerning breakaway systems for sign post assemblies installed along highways became effective. These recommendations include the requirement that any sign post assembly must be capable of breaking away from any direction from which it is impacted. For all practical purposes, this requires a sign support system that will break away from all angles of impact (i.e., 360 degrees).

The design of any sign post assembly must balance the requirements that the assembly be capable of not only holding a sign without bending or breaking from wind load, but also be able to shear off in the event of a vehicular impact. One commonly used sign post design uses perforated square tubing. This tubing has consistent breakaway characteristics, but not at all impact angles. For example, the tubing will generally not break when impacted by a vehicle at one of the four corners of the tubing at appropriate speeds. Therefore, this and other forms of sign post assemblies typically are used in connection with a wide variety of add-on devices engineered to meet the breakaway standards.

These add-on devices include couplers, slip planes, plastic hinges, fracture elements, and various combinations of these. For example, one prior art device includes a sign post assembly having a lower ground post anchored into the ground and partially protruding therefrom. An elongated upper support post designed to carry a sign is then attached to the protruding portion of the lower ground post using a coupler or fastener, manufactured separate and apart from the support post (and possibly using a different type of material), having a breakaway characteristic, such as bolts which are designed to fail under predetermined tensile stresses.

Slip base type mechanisms activate when two parallel plates slide apart as bolts are pushed out under impact. Typically, the parallel plates are inclined with respect to the roadway or ground to ensure that the support post will move upward to allow the impacting vehicle to pass under the sign without its hitting the windshield or the top of the car. One significant disadvantage with slip base type breakaway supports is that the support post will only break away from a limited impact angle. That is, the inclined slip base can only be struck from one direction to yield satisfactorily and thus will not meet the new requirements for signs placed in medians, traffic islands or other locations in which it might be impacted from any of several directions. An improved slip base mechanism is triangular-shaped and is designed to release when struck from any direction. However, these types of sign supports are difficult to install and maintain and are subject to problems caused by wind that causes the bolts in the slip base to loosen. Also, the clamping bolts used with slip base mechanisms must be properly tightened (and maintained). If the bolts are over-torqued, the higher friction between the slip plates may prevent the post from releasing when impacted. Thus, a breakaway system that is not dependent on a specific torque requirement would be beneficial.

These prior art techniques suffer from significant disadvantages in addition to those previously mentioned. For example, they all require the use of an auxiliary add-on device to meet the breakaway criteria. These auxiliary devices increase the cost of the sign post assembly and typically make the installation, maintenance, repair, and replacement of damaged parts due to collisions a difficult and expensive operation.

Accordingly, there is a continuing need for an improved sign post assembly capable of meeting the new breakaway standards. The improved sign post assembly preferably would include a breakaway system incorporated integrally into the support post and not require the use of any type of add-on device. Desirably, the support post having the integrated breakaway system would be structurally adequate to support the sign or other device mounted thereon and would sufficiently resist ice and wind loads while being stable over a suitable time period of use.

SUMMARY OF THE INVENTION

The present invention is directed to an intentional modification of an as-rolled support post to form a defined integral weakened region which will break away upon impact by a vehicle. As used herein, the phrase weakened region refers to an area intentionally designed or altered to fracture upon impact. The weakened region may be formed in any number of ways including swaging (i.e., reducing the cross-sectional size of a portion of the support post), scoring, grooving, dimpling, perforating, or other forms of deforming, re-sizing, or reshaping the support post. The integral weakened region may be included in any form of support post including any cold rolled post shape used in a support method including, but not limited to, traffic signs, delineators, luminaire supports, mailbox and newspaper box supports, motorist-aid call box supports, work-zone temporary signs, barricades, snow fences, and other similar forms of support. For example, the support post may be tubular (round, square, hexagonal, octagonal, etc.), angular, channeled, or flanged channels having a cross-sectional shape similar to a hat. The support post integrally incorporates a weakened region that not only allows for uniform breakability from any approach angle, but also designates a predesigned shear point.

A preferred embodiment of the present invention is directed to a breakaway support post of a selected shape and having one end adapted for carrying an associated structure, such as a traffic sign. The support post includes an integral weakened region providing an area of structural weakness for allowing the support post to shear upon impact by a vehicle traveling at a minimum speed and impacting the support post from any impact angle. The breakaway support post may be anchored directly into the terrain surrounding the post or it may be attached to a ground post anchored below (or inserted into), and partially protruding above, the surrounding terrain. Preferably, the support post is installed such that the integral weakened region is at a predetermined height above the terrain, for example, approximately four inches above the surrounding terrain, so that the portion of the support post which remains anchored to the terrain after impact by a vehicle will not snag on any part of the undercarriage of the vehicle. Preferably, the cross-sectional area of the integral weakened region is the same or slightly less than the cross-sectional area of the other portion(s) of the support post. Thus, the support post having the integral weakened region retains its wind-loading characteristics while having a defined portion capable of breaking away in a consistent manner. In a preferred embodiment, the integral weakened region includes a groove circumscribing the weakened region to further increase and assure the breakability of the support post in a particular area. While the present invention may be used to form a breakaway support post having any selected shape, an illustrated shape is a square tube wherein the integral weakened region is substantially circular in cross-sectional shape.

Another embodiment of the present invention is directed to a sign post assembly that includes a tubular ground post mounted into surrounding terrain, a support post adapted to carry a traffic sign (or similar structure), and a hollow, tubular coupling for connecting the support post to the ground post. Preferably, the coupling attaches the support post to the ground post and includes an integral weakened region providing an area of structural weakness for allowing the coupling to shear upon impact of the sign post assembly by a vehicle traveling at a minimum speed and impacting the sign post assembly from any impact angle. The coupling may be of smaller cross-sectional size than both the support and ground posts such that the ground post and the support post may be slideably received onto the tubular coupling, or the coupling may have a larger cross-sectional size than the support and ground posts such that the posts slide into the coupling. Preferably, the support post, ground post and initial coupling are square in cross-sectional shape and the integral weakened region of the coupling is substantially circular in cross-sectional shape.

Yet another embodiment of the present invention is directed to a hollow, tubular coupling for attaching a support post to a ground post, the coupling having a first end adapted to be attached to the support post, a second end adapted to be attached to the ground post, and a breakaway region integrally formed between the first end and the second end to provide an area of structural weakness capable of breaking as the coupling is subjected to a predetermined lateral load from an object impacting the coupling at any impact angle.

The present invention further provides a method of producing a breakaway support post capable of breaking away upon impact from any impact angle. The method includes the steps of creating an integral weakened region in a support post having a selected shape to provide an area of structural weakness to allow the support post to shear upon impact by a vehicle traveling at a given speed and impacting the support post from any impact angle. For example, the support post may be formed from a hollow, square tube and the method includes using a hydraulic or mechanical press or a manual swaging tool to swage or deform a region of the support post to create an integral weakened region in the support post substantially circular in cross-sectional shape.

BRIEF DESCRIPTION OF THE DRAWINGS

To facilitate further discussion of the invention, the following drawings are provided in which.

These drawings are for illustrative purposes only and should not be used to limit the scope of the claims.

DETAILED DESCRIPTION OF THE INVENTION

Figure 1:
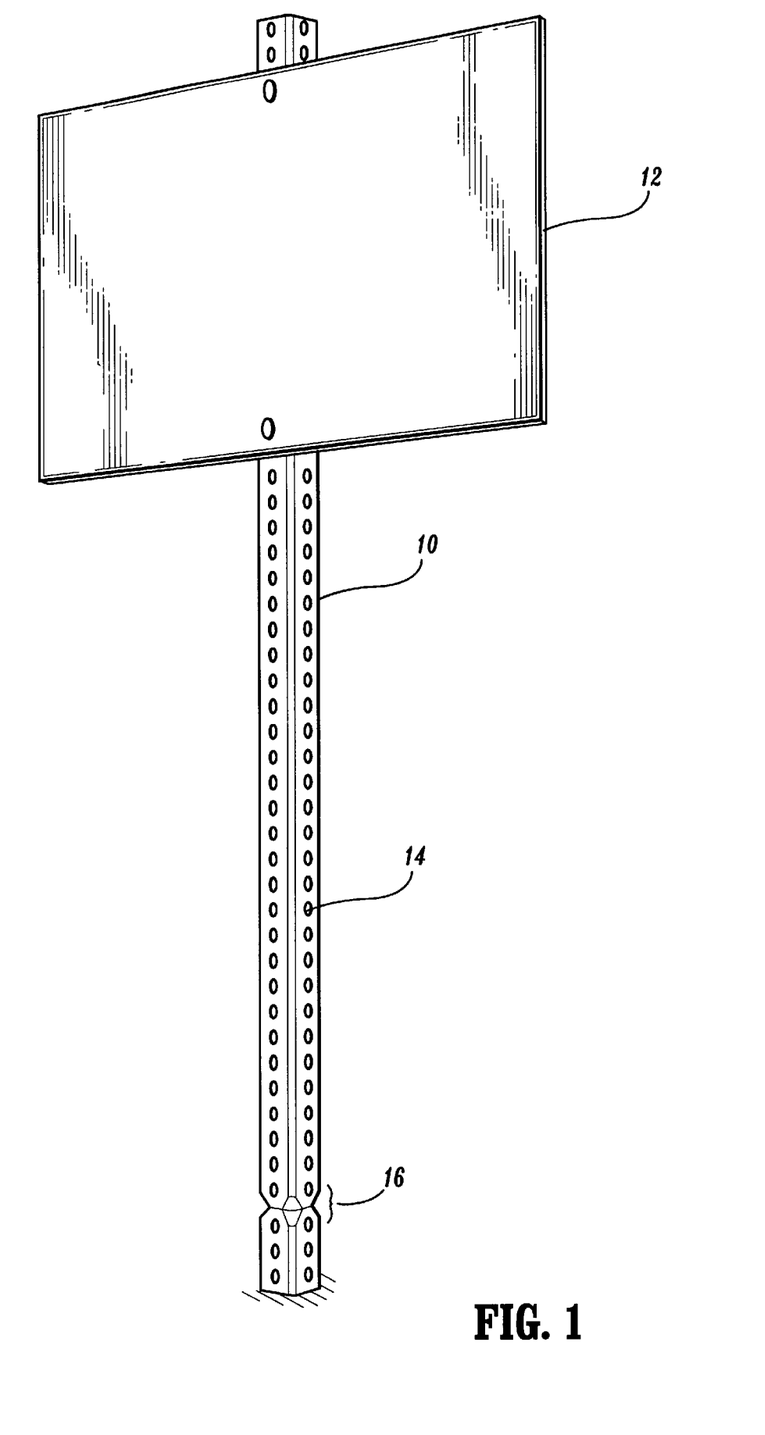
FIG. 1 illustrates a preferred embodiment of the support post of the present invention having an integral weakened region.

A perspective view of a preferred embodiment of a breakaway support post 10 according to the present invention is shown in FIG. 1. The term breakaway support post refers to all types of sign, luminaire, and traffic signal supports that are designed to yield when impacted by a vehicle. For example, the support post may include, or be used with, traffic signs, delineator posts, luminare supports, motorist-aid call boxes, work-zone sign supports, mail or newspaper box supports, barricades, snow fences, and any other types of support posts. The support post 10 may take on a variety of cross-sectional configurations such as, for example, tubular (round, square, hexagonal, octagonal, etc.), angular, hat-shaped channel post (i.e., a channel-shaped post with flanges having a cross-sectional shape similar to a hat). The support post 10 is generally adapted to carry an associated structure 12 on its first end (i.e., the portion of the support post above the weakened region), such as any conventional traffic sign. One configuration for the support post 10, as illustrated in FIG. 1, is square in cross-section, allowing the associated structure 12 to be mounted on any one of four sides of the support post 10. The support post may be of any conventional size, such as a two inch by two inch square tube. The support post may include a number of openings 14 that allow the associated structure 12 to be attached to the support post 10 using suitable fasteners, such as nut and bolt assemblies. The support post 10 may be formed from a wide variety of materials, for example, steel (A570), galvanized steel (A653), or any other suitable material exhibiting the preferred characteristics of having sufficient strength to carry an associated structure (such as a traffic sign) throughout all anticipated environmental conditions (including wind, snow, ice, etc.) and also having sufficient brittleness to break apart at a predefined location upon impact.

Figures 4, 5:
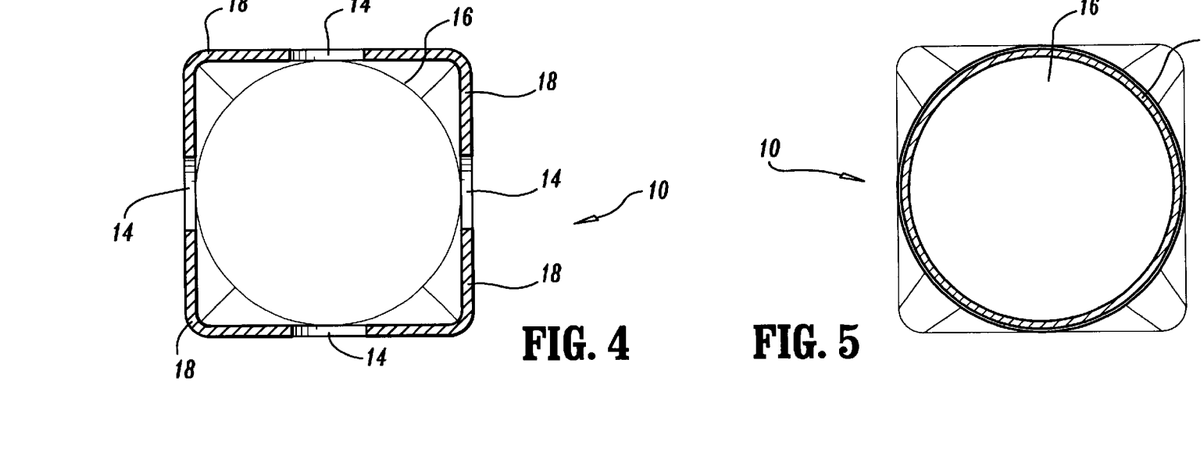
FIG. 4 is a cross-sectional view taken along line 4—4 in FIG. 3.
FIG. 5 is a cross-sectional view taken along line 5—5 in FIG. 3.

The preferred grades of steel may be in the range of 30 to 60. As shown in FIG. 4, the support post 10 is preferably hollow and formed from a tube having a substantially constant thickness, which may vary from approximately 0.073 inches to approximately 0.135 inches, with a tolerance of +/−0.001 to 0.005 inches. Thus, preferred gauges of steel include 10, 12, and 14 gauge steel. The support post 10 may also be painted or galvanized. The support post 10 may be anchored directly into the ground, for example, using concrete or any other type of suitable anchoring material. Alternatively, in a variety of common installations, the support post 10 may be stuck directly into the soil. For purposes herein, the term anchored shall refer to all means of setting the support post into the ground, including using some form of mechanical attachment, using concrete or other similar anchoring material, or simply driving the support post into the soil such that the support post will remain upright and erect.

Figure 2:
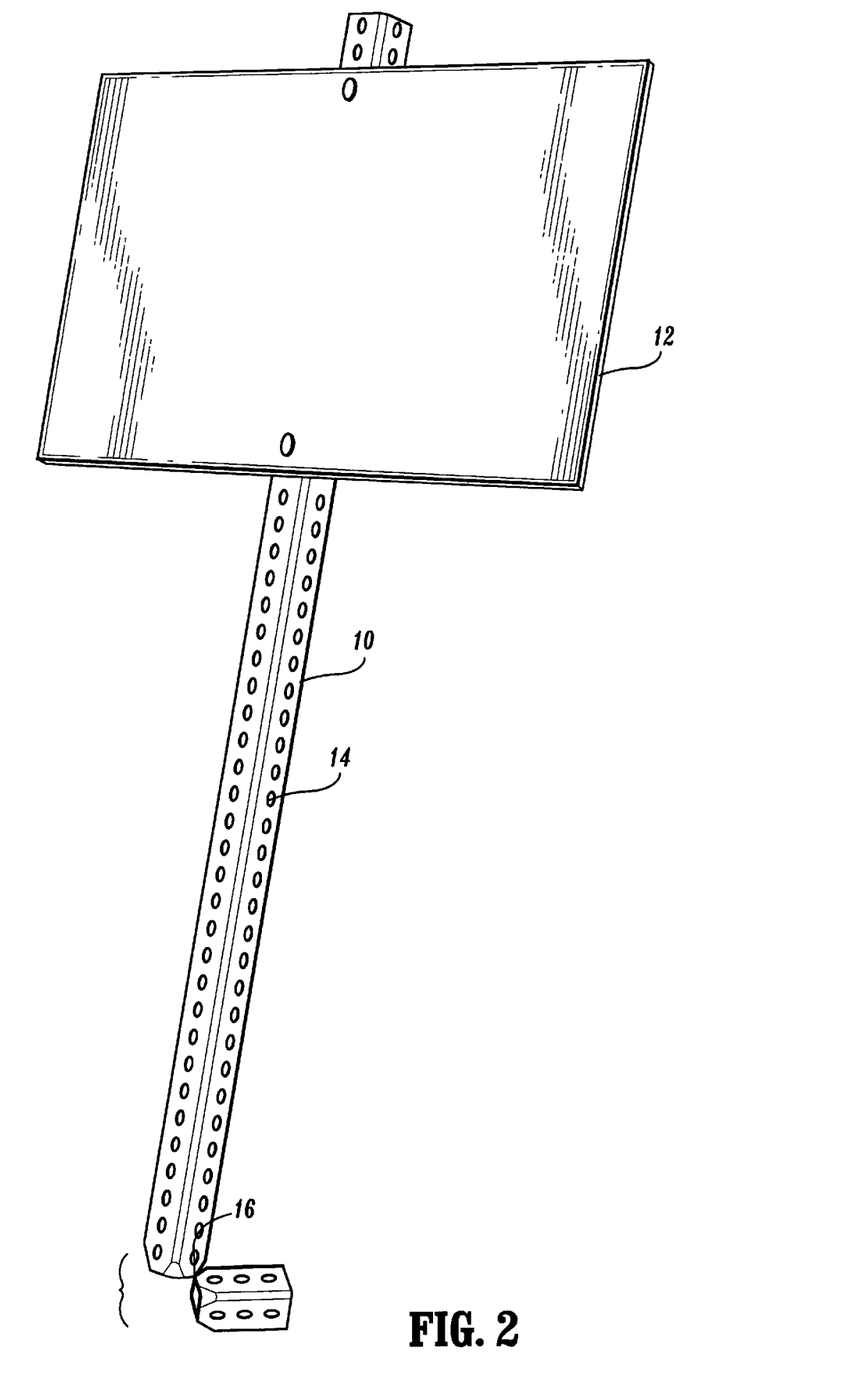
FIG. 2 shows the support post broken apart after impact.

In accordance with the present invention, the support post 10 includes an integrally formed weakened region 16 providing an area of structural weakness for allowing the support post 10 to shear and separate into two sections upon impact by a vehicle traveling at a minimum speed. For example, the weakened region 16 may be designed to shear upon impact by a vehicle traveling at or above 20 mph (32 km/h). Preferably, the weakened region 16 is formed between, and not through, any openings 14 that may be included in the support post 10. As shown in FIG. 2, the weakened region 16 is preferably designed to shear upon impact of the support post 10 from any impact angle, i.e., up to 360 degrees, thus meeting the new standards. Of course, for some installations, the weakened region 16 may be designed to shear upon impact from particular impact angles less than 360 degrees. The weakened region 16 allows the support post 10 to fail in a predictable and consistent manner upon impact from a vehicle. The support post 10 is preferably installed such that the weakened region 16 is located approximately four inches above the surrounding terrain so that the portion of the support post remaining anchored to, or set within, the terrain will not snag on or otherwise interfere with the undercarriage of the impacting vehicle.

Figure 3:
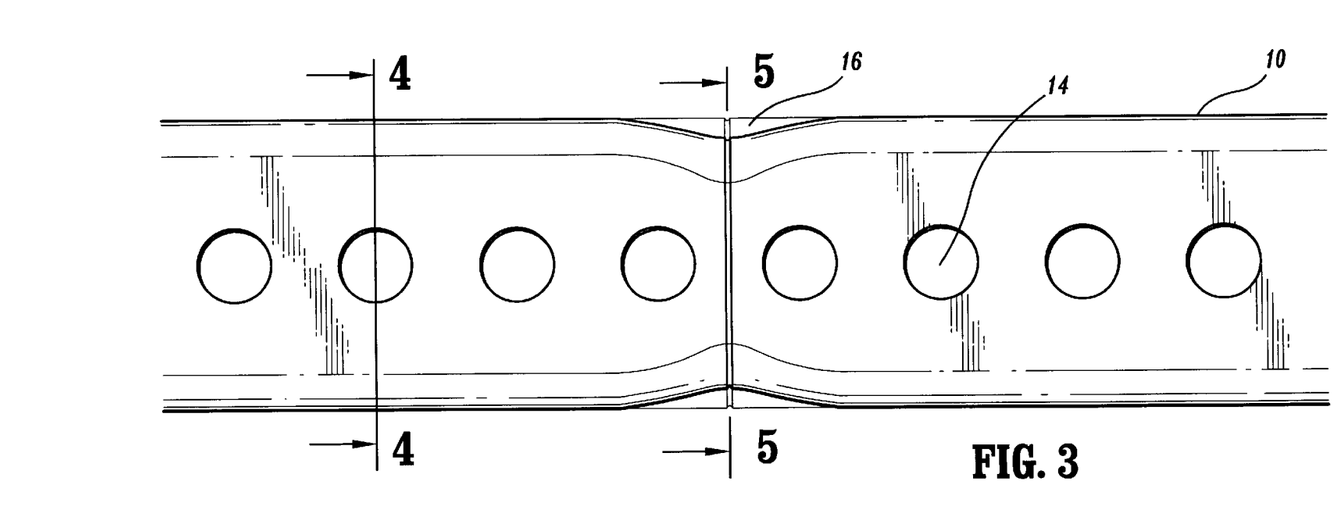
FIG. 3 is a side view of the support post of the present invention further illustrating the integral weakened region.
Figure 6:
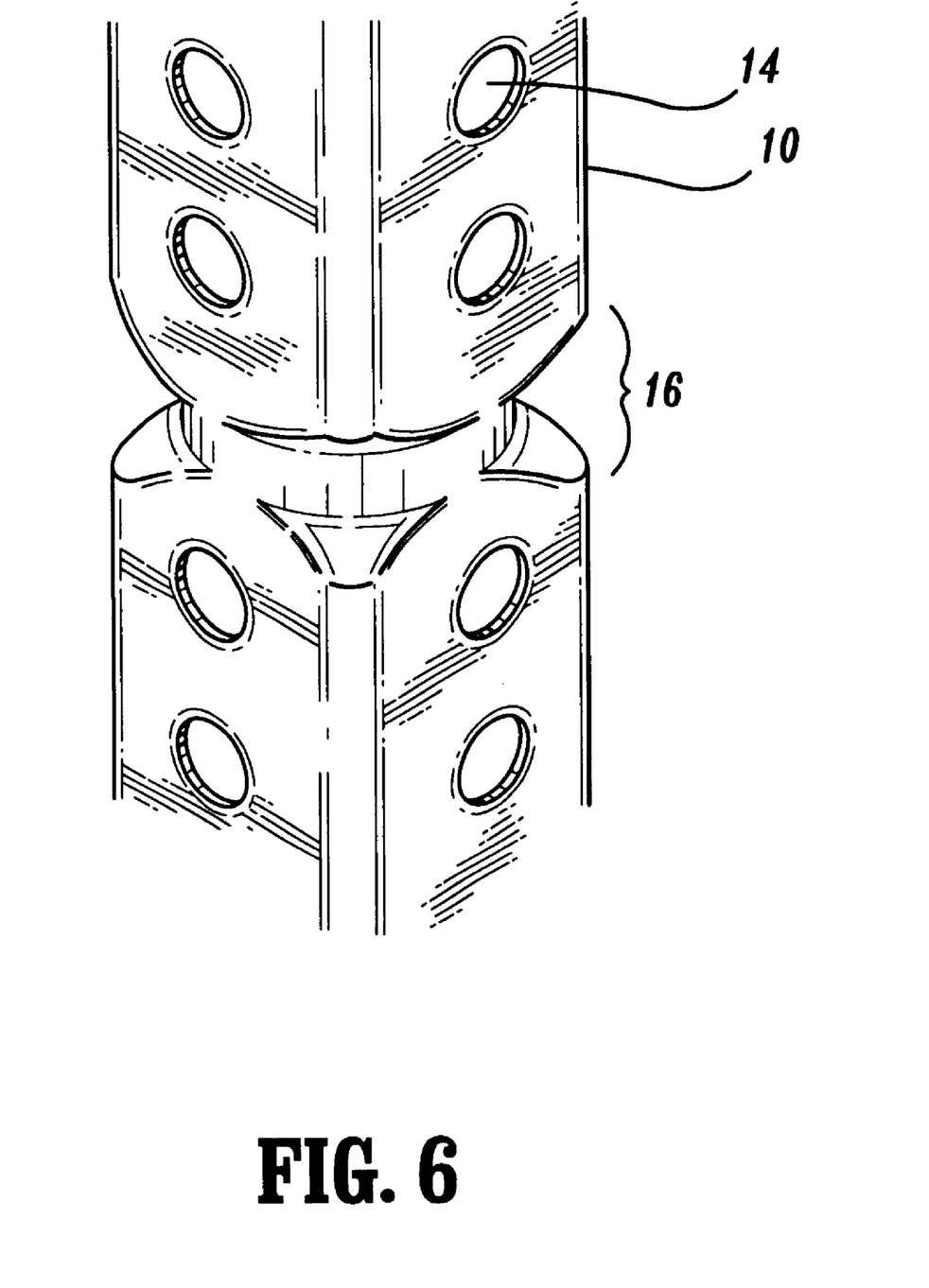
FIG. 6 illustrates a partial view of a support post in accordance with the present invention further illustrating the weakened region integrally formed therein.

FIG. 3 further illustrates the weakened region 16 of the support post 10. The weakened region 16 is preferably formed integrally between the two ends of the support post 10, i.e., the support post 10 having the weakened region 16 is formed from a single piece of material, without the use of any added couplers, fasteners, or other attachments. When using the preferred square support post tube, a portion of the support post 10 is reduced to create the weakened region 16, which preferably has a substantially circular cross-section which expands at its ends to the original shape and size of the support post 10. FIG. 6 further illustrates the preferred concept for forming the weakened region 16. Thus, a portion of the support post 10 is gradually reduced in outside size (i.e., diameter) to form the weakened region 16. The tube may be swaged down over a linear distance of approximately one inch to two inches to the reduced size. Of course, those skilled in the art will appreciate that there are a number of other variations to the dimensions illustrated and discussed herein, including the outsize size of the support post 10, the size (i.e., diameter) of the weakened region 16, and the length of the reduced weakened region 16.

The cross-sectional area of the weakened region 16 is preferably slightly less than the cross-sectional area of the remainder of the support post 10. Thus, if the support post 10 is formed from a hollow, square tube having an outside dimension of two inches by two inches, the weakened region 16 would preferably be slightly less than approximately two inches in diameter. This weakened region 16 having a reduced cross-sectional size is then capable of shearing apart upon impact. As shown in FIGS. 3, 4 and 5, a preferred configuration for the support post 10 includes a square tube and a circular weakened region 16. The circular weakened region 16 is preferably formed such that the corners 18 of the square tube are removed so that the cross-sectional area of the weakened region 16 is slightly less than the cross-sectional area of the tube along a line perpendicular to the support post 10 and extending through the openings 14. Thus, the cross-sectional area of the reduced region 16 (indicated by reference no. 20 in FIG. 5) is less than the cross-sectional area of the four corners 18 of the square tube (as shown in FIG. 4). As will be appreciated by those skilled in the art, because the weakened region 16 is formed from the original square tube, and has a reduced cross-sectional size, the thickness (as defined by reference no. 20 on FIG. 5) of the weakened region 16 will be greater than the thickness of the square tube. Thus, the weakened region 16 may be scored with a groove or channel etched or formed into the weakened region 16 to reduce the cross-sectional area of the weakened region 16 and to further induce the weakened region 16 to sever upon impact. The groove or channel is preferably a rounded or V-shape cut with a depth of approximately between 0.01 and 0.05 inches.

Figure 7:
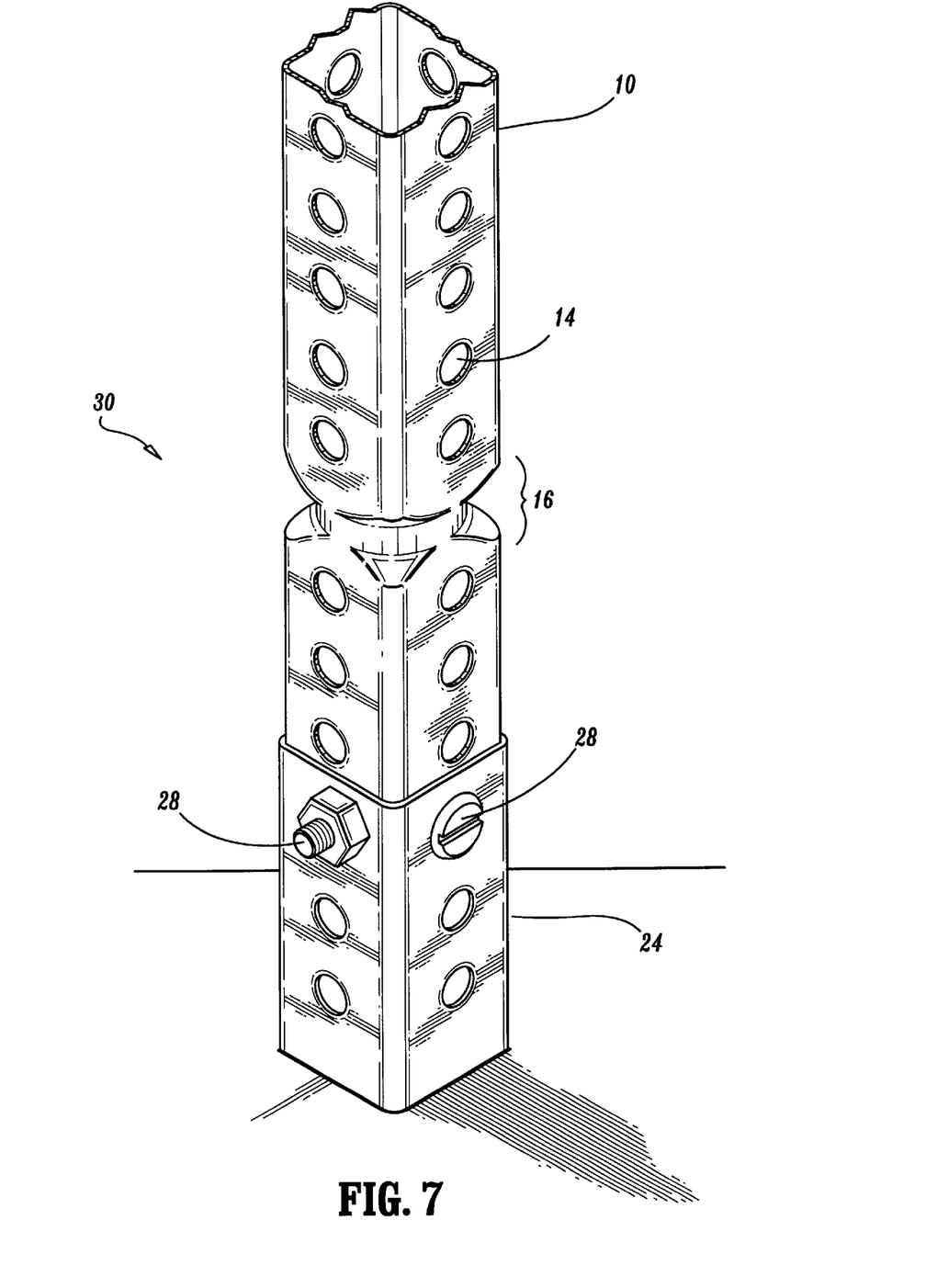
FIG. 7 illustrates the support post of the present invention attached to a ground post.
Figure 8:
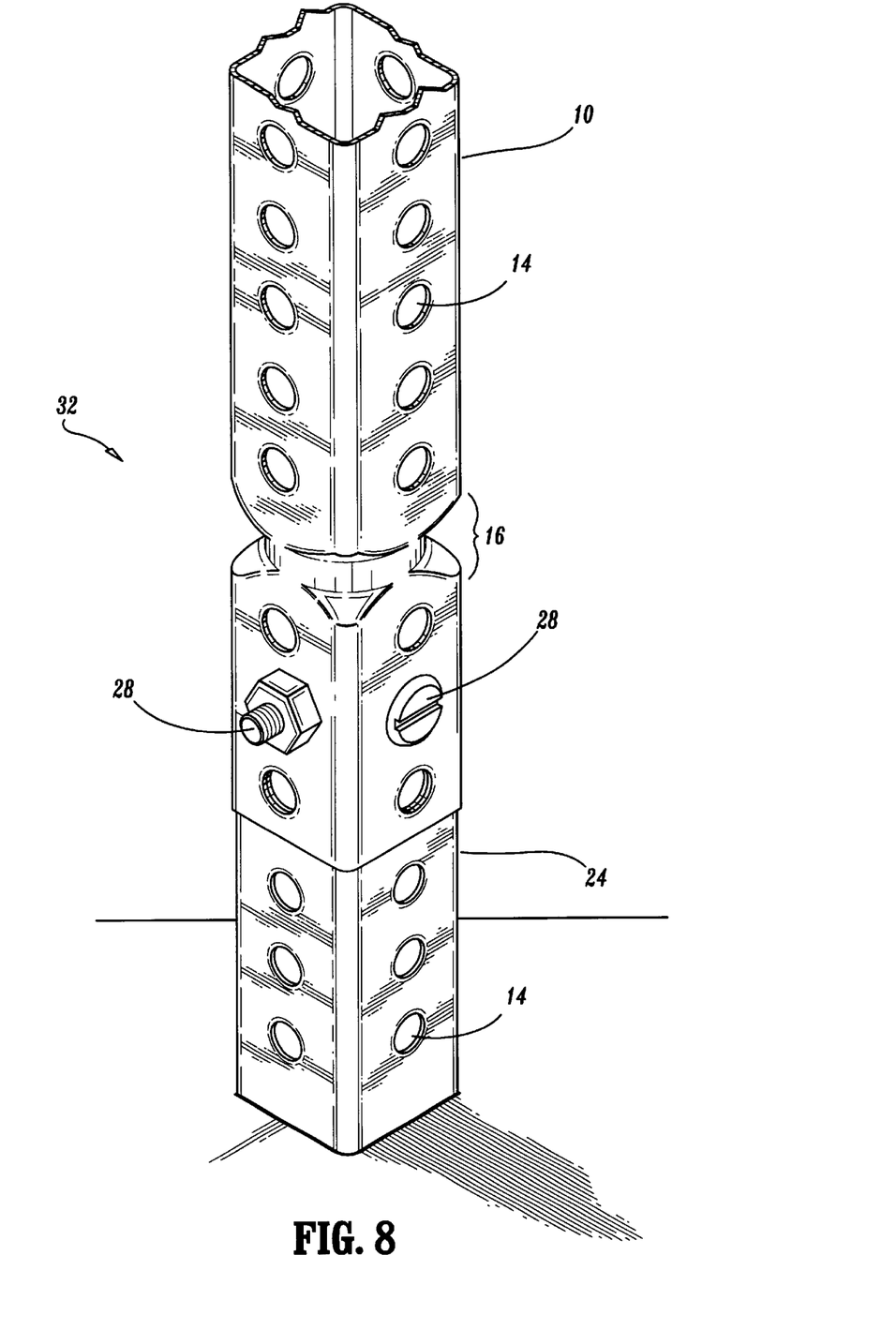
FIG. 8 illustrates the support post of the present invention slideably attached over a ground post.

The support post 10 may be assembled into a complete sign post assembly in a number of ways. FIG. 7 illustrates the present invention used as part of a two-part sign post assembly, including a ground post 24 anchored into the surrounding terrain, with one end projecting above ground level, and a support post 10 adapted to carry an associated structure, such as a highway sign. The ground post 24 may be anchored into the terrain (e.g., using concrete), or simply driven into the soil (with or without mechanical anchoring)

leaving an exposed upper portion above the surface of such terrain. Both the ground post 24 and the support post 10 may be of similar tubular configuration, each having a plurality of openings 14 or holes spaced along the length of each of the posts 10 and 24. Alternatively, the ground post 24 may not include any openings 14. These tubular posts 10 and 24 may preferably be square in cross-section, allowing the associated structure to be mounted on any one of four sides of the support post 10. Preferably, the posts 10 and 24 have differing cross-section sizes, thus allowing the posts to telescope within one another. For example, a lower portion of the support post 10 may be nested within the upper portion of the ground post 24, as shown in FIG. 7, although these relative positions could be reversed, as illustrated in FIG. 8. One preferred embodiment would include a square support post 10 having sides about 1 ¾ inches in width nested within a square ground post 24 having sides about 2 inches in width. The posts 10 and 24 may be attached to one another using a convention fastener 28, such as, for example, a nut and bolt assembly threaded through aligned openings 14 of the posts. The support post 10 and ground post 24 are preferably formed from the same or similar materials used in connection with describing FIGS. 1–6. The sign post assembly 30 illustrated in FIG. 7 is preferably installed into the surrounding terrain such that the weakened region 16 of the support post 10 is about four inches above ground level. In the event that the support post 10 is struck by a vehicle traveling at or above a minimum speed, the support post 10 will shear in the area defined by the weakened region 16. As a result, the support post 10 and its associated structure will break away from the ground post 24, thus limiting the damaging force of the support post 10 on the vehicle and reducing the likelihood of injury to the occupants of the vehicle. The portion of the support post 10 below the integral weakened region 16 remains engaged with the ground post 24 close to ground level. The displaced support post 10 may be readily replaced with a new support post 10 without the necessity to excavate and repair or replace the ground post 24. The ease of installation of the support post 10 substantially reduces the time required to replace the support post.

In addition to a reduced cross-sectional area weakened region, the weakened region may take on a number of other forms. For example, the weakened region may be formed by creating a series of dimples in the support post, by creating a rounded or V-shaped groove in the support post, or by creating a series of perforations in the support post. Each of these variations share the trait of creating a integral weakened region of reduced cross-sectional area that allows the support post to shear off upon impact.

Figure 9:
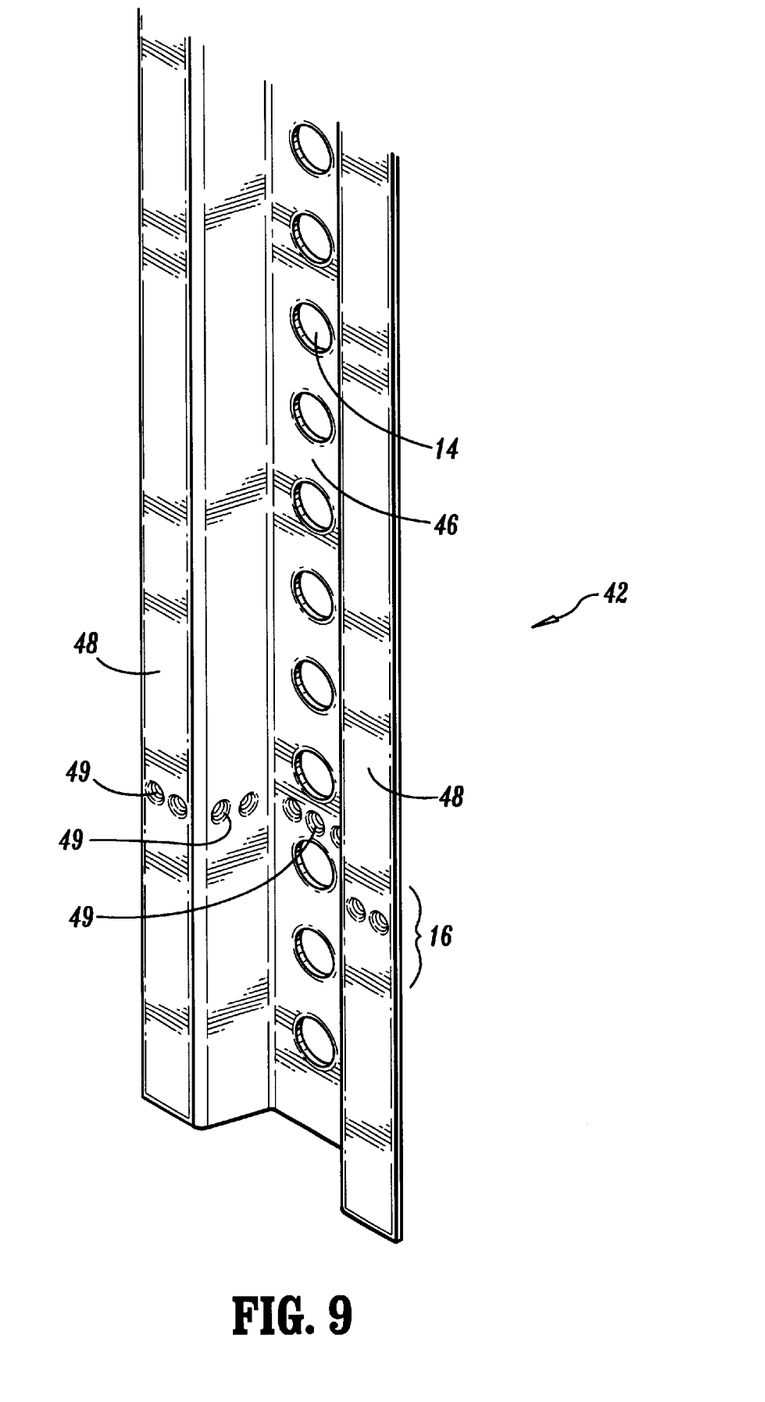
FIG. 9 illustrates the present invention used in conjunction with a hat-shaped channel support post and wherein the integral weakened region comprises a series of dimples formed into the support post.
Figure 10:
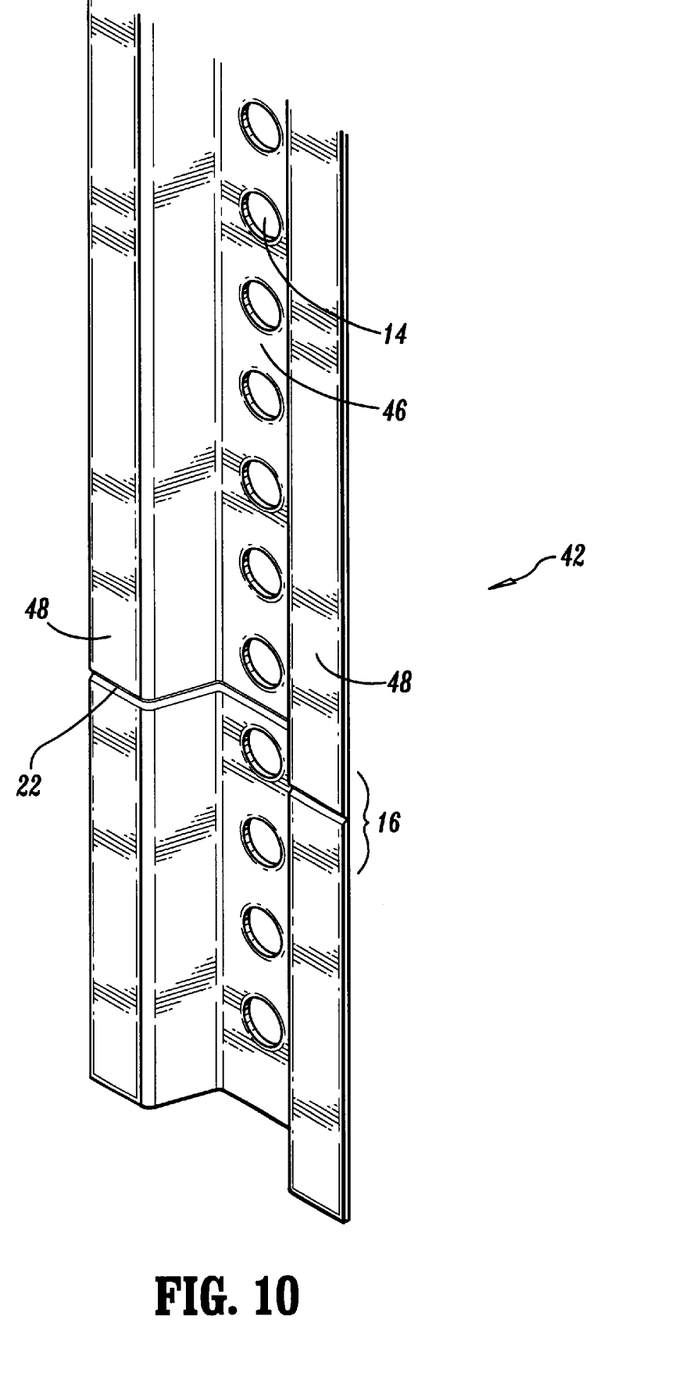
FIG. 10 illustrates the present invention used in conjunction with a hat-shaped channel support post and wherein the integral weakened region comprises a groove formed into the support post.

The principles illustrated in FIGS. 1–8 of using a square tubular post may be used with other forms of tubular posts, including round, hexagonal, and octagonal posts. For example, FIG. 9 illustrates a sign post assembly comprising a U-shaped channel post 42. The U-shaped post 42 has a flat center web 46 and two side walls 48 divergently extending angularly and outwardly therefrom. The center web 46 has spaced apart openings 14 along its length to allow mounting of a sign to the web 46 at a selected height with one or more suitable fasteners, such as bolts or screws. This type of support post will be referred herein as a hat-shaped channel post. The channel post 42 includes a breakaway region 16 designed to allow the channel post 42 to shear upon impact. The breakaway region 16 may be formed in a number of ways For example, FIG. 9 illustrates the breakaway region 16 being formed as a series of dimples 49 set along a perpendicular line within the channel post 42. The series of dimples 49 may be formed using a pre-configured die. In an alternative embodiment, FIG. 10 illustrates the hat-shaped channel post 42 having an integral weakened region 16 comprising a groove 22 or continuous depression scored into the channel post 42. The groove 22 is preferably scored into the channel post 42 by using an appropriate die. In both of these embodiments, the dimples 49 or groove 22 create the integral weakened region of reduced cross-sectional area that allows the channel post 42 to shear off upon impact.

Figure 11:
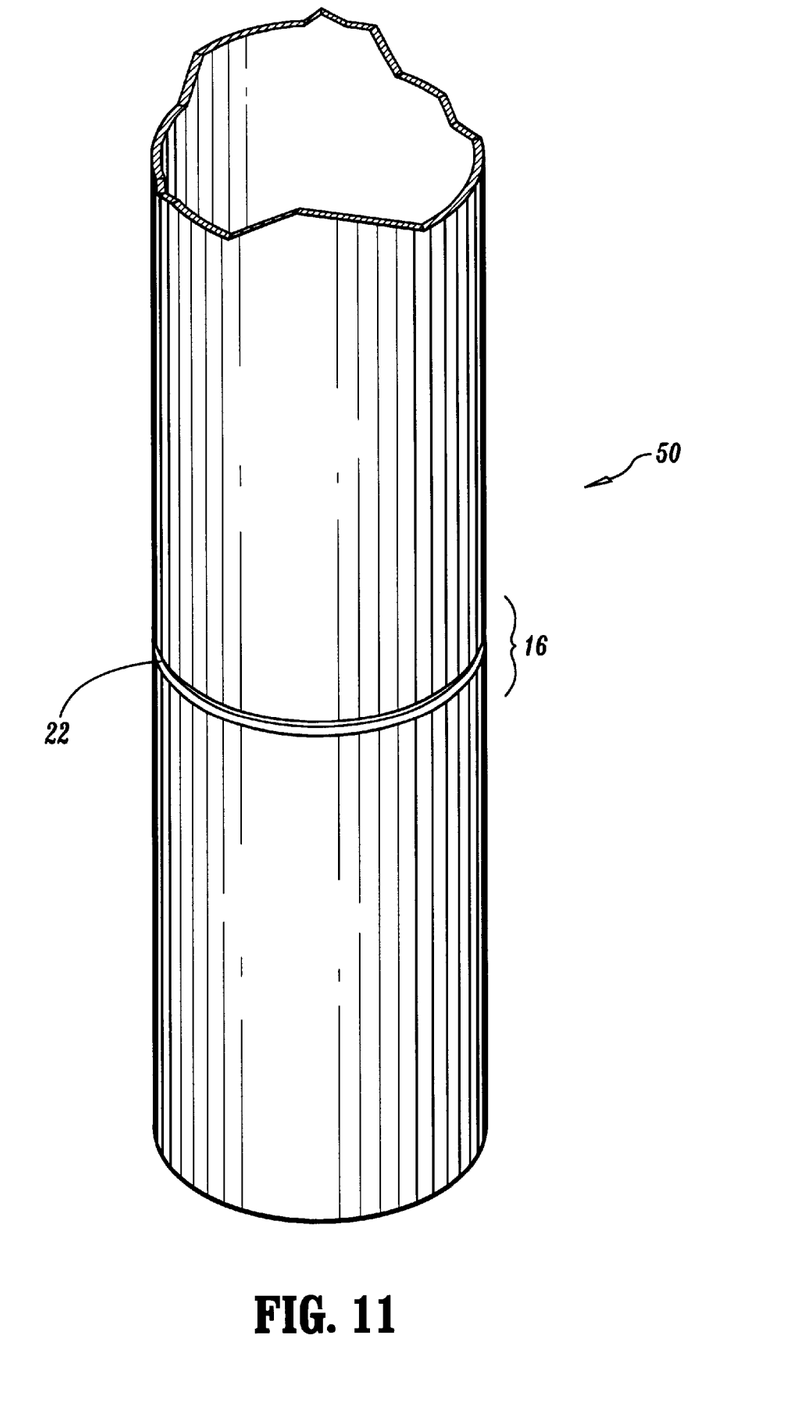
FIG. 11 illustrates the present invention used in conjunction with a round support post and wherein the integral weakened region comprises a groove scored into the support post.
Figure 12:
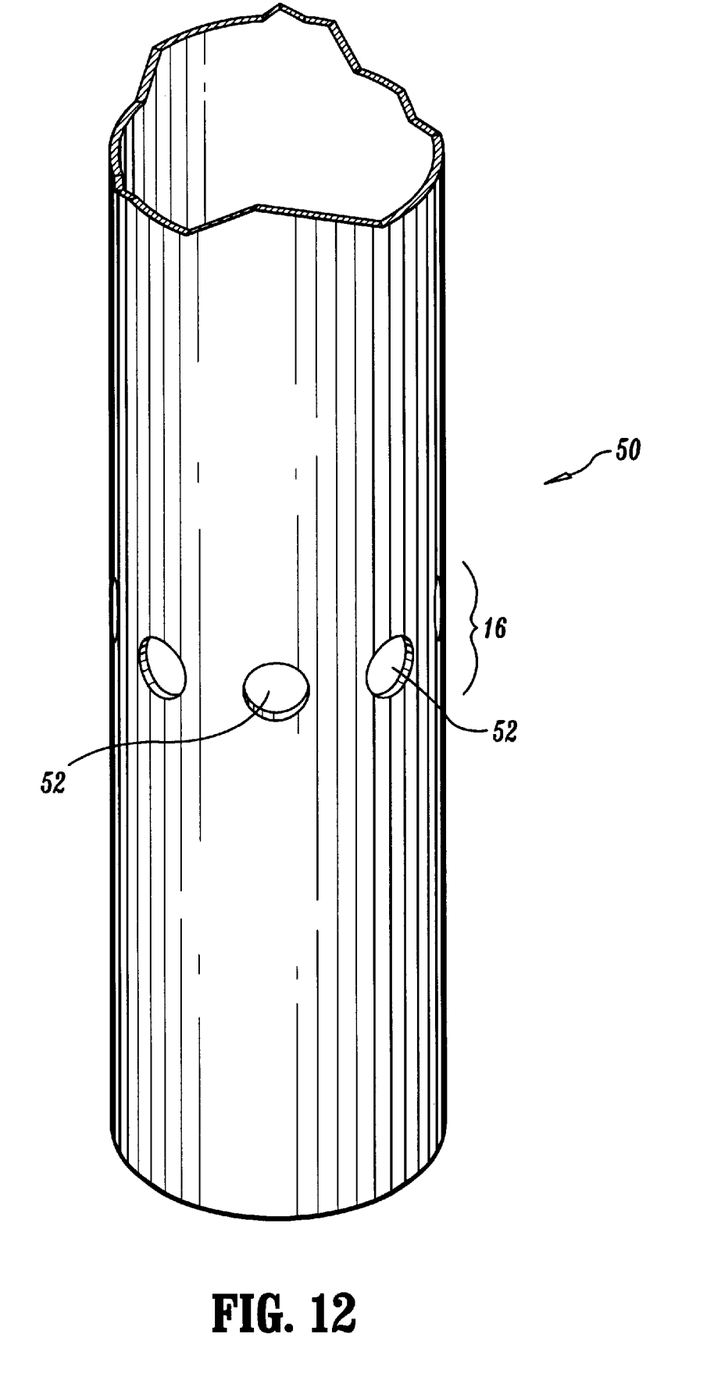
FIG. 12 illustrates the present invention used in conjunction with a round support post and wherein the integral weakened region comprises a series of perforations formed in the support post.

FIGS. 11 and 12 illustrate another embodiment of the present invention in which the support post 50 is formed as a round tube. FIG. 11 illustrates the weakened region 16 formed as a groove 22 scored into the support post 50. FIG. 12 illustrates the weakened region 16 formed as a series of perforations 52 formed within the support post 50. The perforations 52 may be formed in the support post 50 using a mechanical press or may be formed in-line with the original steel forming the support post 50.

All of these forms of creating the weakened region (reducing the cross sectional area of a region of the support post by swaging, dimpling, scoring or grooving, or perforating) described herein may be combined in a number of ways depending on the particular size and shape of the material used to create the support post and for the particular installation the post is designed. Additionally, all of these forms of creating the weakened region may be used on each of the various forms of support posts described herein, including tubular (round, square, hexagonal, octagonal, etc.), angular, or a hat-shaped channel post.

Figure 13:
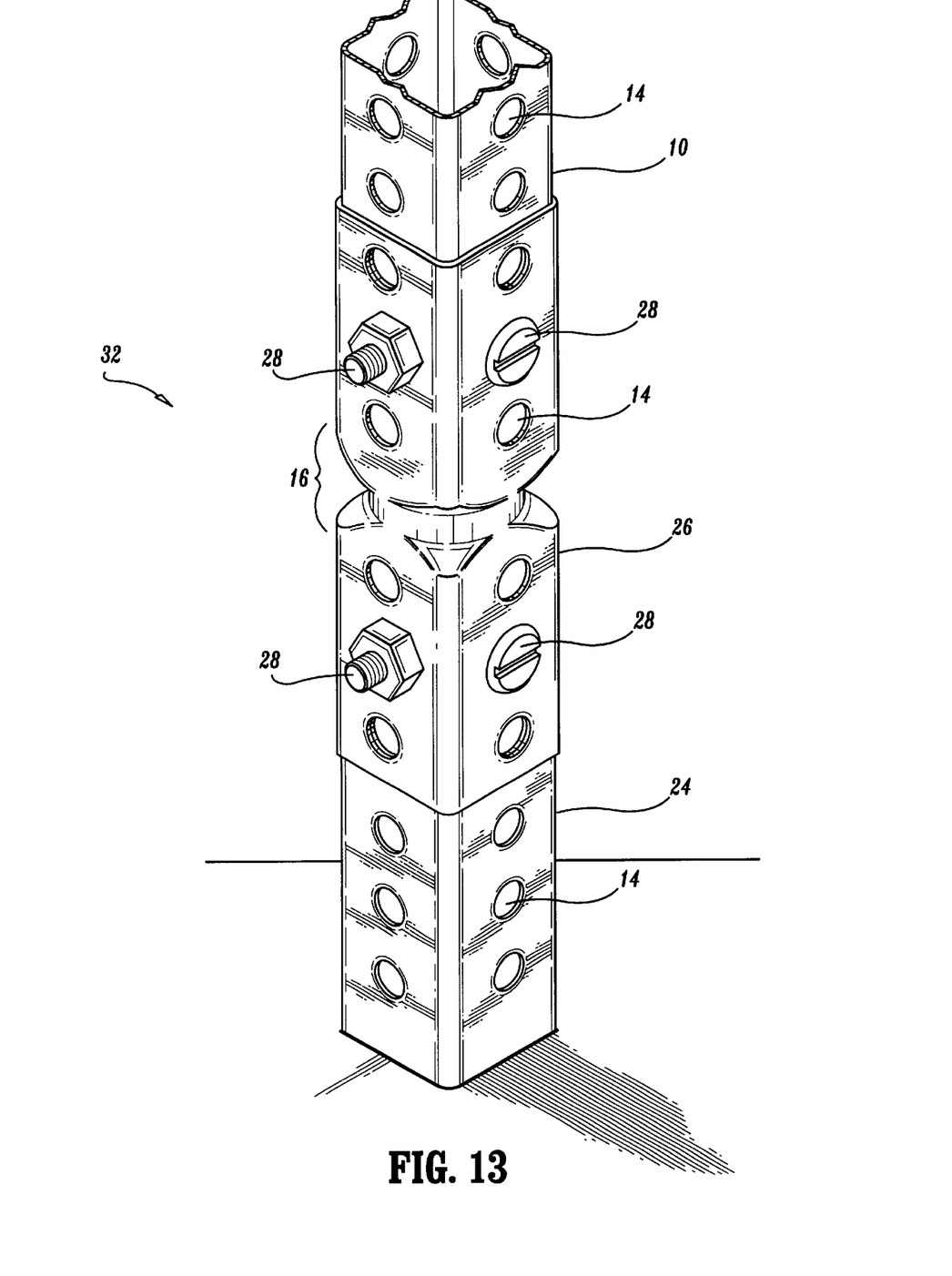
FIG. 13 illustrates the tubular coupling of the present invention attaching a support post to a ground post.
Figure 14:
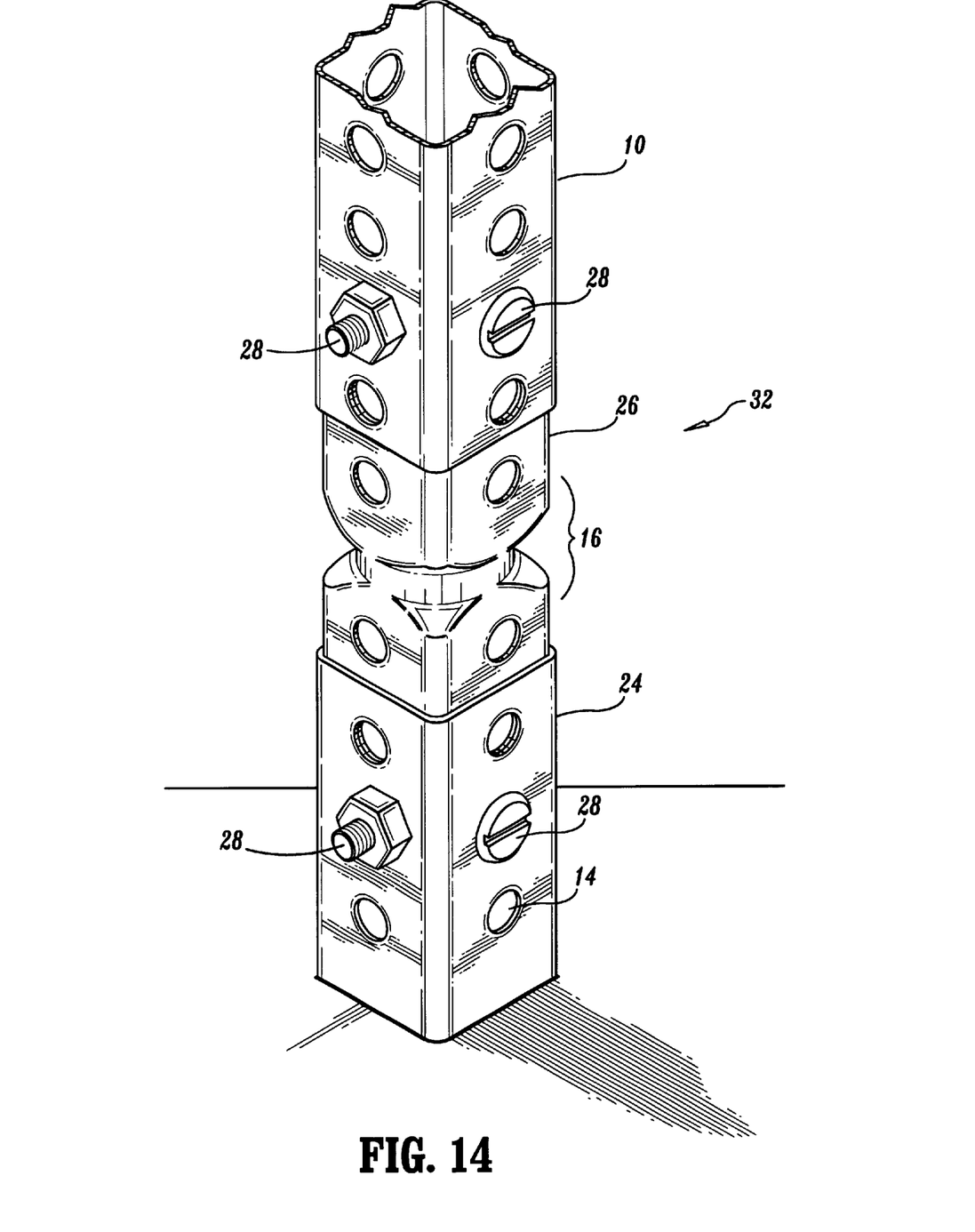
FIG. 14 illustrates another embodiment of the tubular coupling of the present invention attached as an interior coupling to a support post and a ground post.

In another embodiment of the present invention shown in FIG. 13, a three-piece sign post assembly 32 includes a support post 10, a ground post 24, and a breakaway coupling 26 attaching the terrain engaging ground post 24 to the sign-carrying support post 10. For example, the breakaway coupling 26 may include a plurality of openings 14 spaced along its length, which may be aligned with similar openings 14 in the ground post 24 and the support post 10 for attachment therewith using a fastener 28, such as bolt and nut assemblies threaded through the aligned openings 14. The breakaway coupling 26 preferably includes a weakened region 16 positioned between the support post 10 and the ground post 24. The weakened region 16 is preferably breakable to facilitate releasing the support post 10 from the ground post 24 in response to a lateral force, such as upon impact by a vehicle traveling at or above a minimum speed. FIG. 13 illustrates the breakaway coupling 26 having a larger inside size than the outside size of the support post 10 and the ground post 24. It will be appreciated that these relative sizes could be interchanged as shown in FIG. 14, which illustrates the coupling 26 installed within the interior of the larger sized support post 10 and ground post 24.

The breakaway coupling 26 is formed in a manner similar to that described above in connection with the support post 10 having the weakened region 16. Thus, the breakaway coupling 26 may be formed from a hollow square tubing, which has had a portion of it swaged down to create the reduced-diameter circular weakened region 16. Preferably, the breakaway coupling 26 is formed in the same fashion as the support post 10 described above in connection with FIGS. 1–8, with the exception being the overall length of the post.

The breakaway coupling 26 may be readily applied to a new installation or to retrofit an existing installation. For example, the presently preferred breakaway coupling 26 is particularly adapted for use when repairing an existing sign post assembly that has been damaged as a result of an impact with a vehicle or other damage incurred during use of the sign post assembly. As is known, a current installation may include a support post mounted into a ground post. This assembly may become damaged as a result of being struck by a vehicle. The accident may have caused the original support post 10 to be bent in the region near its attachment to the ground post 24. The damaged support post 10 may then be sawed off and re-attached to either the ground post 24 or the portion of the initial support post 10 remaining attached to the ground post using the breakaway coupling 26 of the present invention. Moreover, the coupling may be used in a single support structure installation or a multiple post installation.

Other variations of support post assemblies and couplings may also be formed using the present invention. For example, a support post or coupling may be formed having multiple weakened regions designed to allow the support post or sign post assembly to shear off at a number of different heights. This embodiment may be useful for sign post assemblies installed at locations in which they may be impacted at various heights, for example, from vehicles having bumpers positioned at substantially different heights. The presently described invention could also be used with large roadside signs carrying signs greater than 5 square meters in area, which typically are supported by two or more breakaway support posts.

The present invention also includes a novel method of forming a support post having a reduced cross-section area that will break upon impact of a vehicle traveling at a minimum speed. The initial selected shape may be of any of a variety of cross-sectional configurations such as, for example, tubular (round, square, octagonal, etc.), angular, or channel hat-shaped. A weakened region is integrally formed into the support post. For example, using a tubular support post, the support post may inserted into a hydraulic, mechanical or manual press capable of swaging or deforming a portion of the support post to reduce a portion of the cross-sectional area of the region of the support post placed within the press. For example, a Finn Power FP 140X Swaging Machine, produced and sold by Finn Power USA, may be used to reduce the cross-sectional area of a portion of the support post. The press may be operated in-line with other forming equipment to create the integral weakened region as the steel is formed into posts. When using a square support post, the press preferably uses sufficient pressure to swage or reduce the region of the support post a controlled distance to create an integral weakened region in the support post substantially circular in cross-sectional shape providing an area of structural weakness for allowing the support post to shear upon impact by a vehicle traveling at a minimum speed and impacting the support post from a desired impact. Thus, the original support post may be inserted into the press having a die capable of forming a circular weakened region, wherein the post is set within the press such that the weakened region will be formed at a predetermined location.

Preferably, the die may include a raised region to create a groove or score in the weakened region to further enhance the breakability of the support post. Other die sets may also be used to produce other forms of deformation in the support post, including a rounded or V-shaped groove, dimples, or perforations. For example, the method described herein may be used to produce the support posts, sign post assemblies, and couplings described in connection with FIGS. 1–14.

The sign post assemblies having an integrated breakaway system described herein combine the desirable functions of structure-bearing and breakaway. The support post or breakaway coupling incorporated into such sign post assemblies are of simple and economical construction, which substantially reduces the costs to provide a support post meeting the new breakaway requirements. Moreover, the present invention produces an integrated system that eliminates the need for the customer to purchase a support post and a costly add-on breakaway device.

Although the present invention has been described in considerable detail with reference to certain preferred versions thereof, other versions are possible without departing from the spirit and scope of the present invention. Therefore the spirit and scope of the appended claims should not be limited to the description of the preferred embodiments described herein. For example, the integrated breakaway concept of this invention may be used in any application associated with traffic right-of-way safety such as A-frame barricades using angular legs, delineator posts, work-zone marking devices and temporary construction fixtures.

What is claimed is:

1. A breakaway support post hating a selected shape and comprising a first end adapted for carrying an associated structure and an integral weakened region formed by reducing the cross-sectional area of a portion of the support post and further comprising a groove circumscribing the integral weakened region, the integral weakened region providing an area of structural weakness for allowing the support post to shear in the integral weakened region upon impact by a vehicle traveling at a minimum speed and impacting the support post from any desired impact angle.

2. A breakaway support post having a selected shape and comprising a first end adapted for carrying an associated structure and an integral weakened region formed by reducing the cross-sectional area of a portion of the support post and further comprising a series of dimples formed into the support post such that the support post will break away along the series of dimples the integral weakened region providing an area of structural weakness for allowing the support post to shear in the integral weakened region upon impact by a vehicle traveling at a minimum speed and impacting the support post from any desired impact angle.

3. A breakaway support post having a hat-shaped channel shape and comprising a first end adapted for carrying an associated structure and an integral weakened region formed as a groove or a series of dimples formed within the support post to reduce a portion of the cross-sectional area of the support post such that the support post will break away upon impact along the groove or series of dimples the integral weakened region providing an area of structural weakness for allowing the support post to shear in the integral weakened region upon impact by a vehicle traveling at a minimum speed and impacting the support post from any desired impact angle.

4. A breakaway support post having a square tubular shape and comprising a first end adapted for carrying an associated structure and an integral weakened region that is substantially circular in cross-sectional shape and is slightly less in size than the cross-sectional area of the first end of the support post, and wherein the integral weakened region further comprises a groove circumscribing the integral weakened region the integral weakened region providing an area of structural weakness for allowing the support post to shear in the integral weakened region upon impact by a vehicle traveling at a minimum speed and impacting the support post from any desired impact angle.

* * * * *